(12) United States Patent
Endo (10) Patent No.: US 6,628,898 B2
(45) Date of Patent: Sep. 30, 2003

(54) OPTICAL APPARATUS

(75) Inventor: Takayuki Endo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/230,122

(22) Filed: Aug. 29, 2002

(65) Prior Publication Data

US 2003/0044174 A1 Mar. 6, 2003

(30) Foreign Application Priority Data

Sep. 3, 2001 (JP) ........................................ 2001-265333

(51) Int. Cl.⁷ .............................................. G03B 17/00
(52) U.S. Cl. ...................... 396/51; 396/55; 348/208.99
(58) Field of Search .............................. 396/52–55, 51; 348/208.99, 333.03, 333.09

(56) References Cited

U.S. PATENT DOCUMENTS

| | | | | |
|---|---|---|---|---|
| 4,780,739 A | * | 10/1988 | Kawakami et al. | 396/55 |
| 5,576,787 A | * | 11/1996 | Kai et al. | 396/55 |
| 5,583,597 A | * | 12/1996 | Enomoto | 396/55 |
| 5,585,884 A | | 12/1996 | Onuki | 396/51 |
| 5,621,174 A | * | 4/1997 | Amanuma et al. | 396/52 X |
| 5,734,932 A | * | 3/1998 | Washisu | 396/55 |
| 5,768,634 A | * | 6/1998 | Nagai et al. | 396/54 |
| 6,072,525 A | * | 6/2000 | Kaneda | 348/208.99 |
| 2001/0033331 A1 | * | 10/2001 | Eto et al. | 348/208.99 |
| 2003/0063904 A1 | * | 4/2003 | Mizumura | 396/55 |

FOREIGN PATENT DOCUMENTS

| | | | | |
|---|---|---|---|---|
| JP | 64-42639 | 2/1989 | ............ | G03B/3/11 |
| JP | 3-192338 | 8/1991 | ............ | G03B/13/02 |
| JP | 5-107621 | 4/1993 | ............ | G03B/17/00 |

* cited by examiner

Primary Examiner—W. B. Perkey
(74) Attorney, Agent, or Firm—Fitzpatrick, Cella, Harper & Scinto (57) ABSTRACT

There is provided an optical apparatus includes a sensor for detecting vibration that is caused in the optical apparatus, a blur correction unit for correcting blur of an image obtained by the optical system, a control unit for controlling driving of the blur correction unit according to an output of the sensor, a finder for observing the image obtained by the optical system, the finder having an eyepiece optical system; and a display for displaying the image obtained by the optical system, in which the control unit changes a vibration detection frequency band depending on whether the finder is used or the display is used.

6 Claims, 9 Drawing Sheets

OPTICAL APPARATUS

BACKGROUND OF THE INVENTION

1. Field of the Invention

The present invention relates to an optical system such as a camera with an image blur correction function provided with means for detecting vibration that has occurred in the camera and correcting image blur due to the vibration of the camera.

2. Related Background Art

In existing cameras, since all operations important for photographing such as decision of exposure and focusing are automated, even a person who is inexperienced in handling a camera is very unlikely to fail in photographing.

In addition, recently, a system for preventing hand vibration affecting a camera has been studied, and factors causing failure in photographing of a photographer have been almost eliminated.

Here, a system for preventing hand vibration will be described briefly.

Hand vibration of a camera at the time of photographing is usually a frequency of 1 to 12 Hz. As a basic idea for making it possible to take a picture without image blur even if such hand vibration occurs at the time of releasing, vibration of the camera due to the hand vibration has to be detected to displace a correction lens according to a value of the detection. Therefore, in order to realize photographing of a picture without image blur even if vibration of a camera occurs, it is necessary to detect vibration of the camera accurately and, then, correct a change in an optical axis due to hand vibration.

Theoretically, the detection of vibration (camera vibration) can be performed by mounting on a camera a vibration sensor for detecting an angular acceleration, an angular velocity, an angular displacement and the like and vibration detection means for electrically or mechanically integrating output signals of the vibration sensor to output an angular displacement. Then, vibration correcting means for decentering a photographing optical axis is driven based on information of this detection, whereby image blur control becomes possible.

On the other hand, in a digital camera including a digital single-lens reflex camera that has been actively developed recently, there are provided film camera and a display for displaying an image signal obtained from an image pickup element such as a CCD or CMOS sensor as means for checking a subject image during photographing. With such a digital camera, photographing can be performed using either the display or the finder.

In general, as a way of setting the digital camera in holding it by hands to photograph an image, when the finder is used, what is regarded as ideal is a method of tightening both sides to hold the digital camera by both hands in the same manner as holding a silver salt camera and bringing a photographer's face (eyebrow part) into contact with an eyepiece part of the digital camera when the photographer looks into the finder.

On the other hand, when the display is used, a method of holding the digital camera by both hands to set it in a position where the photographer can easily see the display (20 to 30 cm ahead of the face) is generally used.

As described above, since the digital camera is supported at three points of both the hands and the face in using the finder to photograph an image by the digital camera, the digital camera can be set relatively stably. However, if an image is photographed using the display, since the digital camera is supported only by both the hands as described above and is set in the position 20 to 30 cm ahead of the face of the photographer, both the arms cannot be fixed and a posture of the photographer becomes unstable. Thus, hand vibration, especially vibration of a low frequency over the entire arms becomes large.

As described above, a frequency band of hand vibration is usually regarded as 1 to 12 Hz, and the conventional camera with image blur correction function is usually designed to correct camera vibration of 1 Hz or more. However, the frequency band of hand vibration usually regarded as 1 to 12 Hz assumes the case in which the photographer uses the finder to perform photographing and does not take into account low frequency vibration over the entire arms when the photographer uses the display of the digital camera to perform photographing.

On the other hand, in recent years, patent applications have been filed for an invention in which a camera detects that a photographer becomes prepared for photographing and starts a specific operation of the camera. For example, Japanese Patent Application Laid-Open No. 64-42639 discloses a technique in which light projecting and receiving elements are arranged in an eyepiece part of a camera and the camera detects a photographer's operation for looking into the eyepiece part by the elements to start auto-focus control. In addition, Japanese Patent Application Laid-Open No. 3-192338 discloses a technique in which a camera judges approach of a face of a photographer by a line-of-sight detection means and, upon detecting that a pupil of the photographer is observing a finder of the camera, starts auto-focus control or the like. In addition, Japanese Patent Application Laid-Open No. 5-107621 discloses a technique in which, upon detecting approach of a photographer by light projecting and receiving elements of an eyepiece part of a camera or line-of-sight detection means, the camera starts an image blur correction operation.

The above-mentioned conventional techniques are for starting the above-mentioned respective operations according to an output of the light projecting and receiving elements of the eyepiece part of the camera or detection results of the line-of-sight detection means. However, those patent applications do not refer to a method of judging whether a photographer is using a finder or a display.

SUMMARY OF THE INVENTION

The present invention has been devised in view of the above and other drawbacks, and thus it is an object of the present invention to provide an optical apparatus having a finder and a display that can perform image blur correction satisfactorily even if the finder or the display is used to perform photographing.

In addition, it is another object of the present invention to provide an optical apparatus that can satisfactorily correct low frequency hand vibration in using a display to perform photographing.

In order to achieve the above-described objects, according to the present invention, there is provided an optical apparatus having an optical system, comprising:

a sensor for detecting vibration that is caused in said optical apparatus;

a blur correction unit for correcting blur of an image obtained by said optical system;

a control unit for controlling driving of said blur correction unit according to an output of said sensor;

a finder for observing the image obtained by said optical system, said finder having an eyepiece optical system; and a display for displaying the image obtained by said optical system, wherein said control unit changes a vibration detection frequency band depending on whether said finder is used or said display is used.

In particular, the above-described finder is an optical finder.

Further, the above-described finder is an electronic finder for observing the image displayed on said display via said eyepiece optical system.

Still further, when said display is used, the above-described control unit extends the vibration detection frequency band of said sensor to a frequency area lower than that at the time when said finder is used.

The optical apparatus further comprises a detection unit for detecting whether or not a photographer has approached said finder, wherein the control unit changes a control characteristic of said blur correction unit according to an output of said detection unit.

The optical apparatus further comprises a switch for switching display and non-display states of said display, wherein said control unit changes a control characteristic of said blur correction unit according to a state of said switch.

Note that more specific applications of the present invention will be apparent in the detailed description of the invention described later.

DESCRIPTION OF THE PREFERRED EMBODIMENTS

The present invention will be described in detail based on embodiments shown in the accompanying drawings.

First Embodiment

Figure 1:
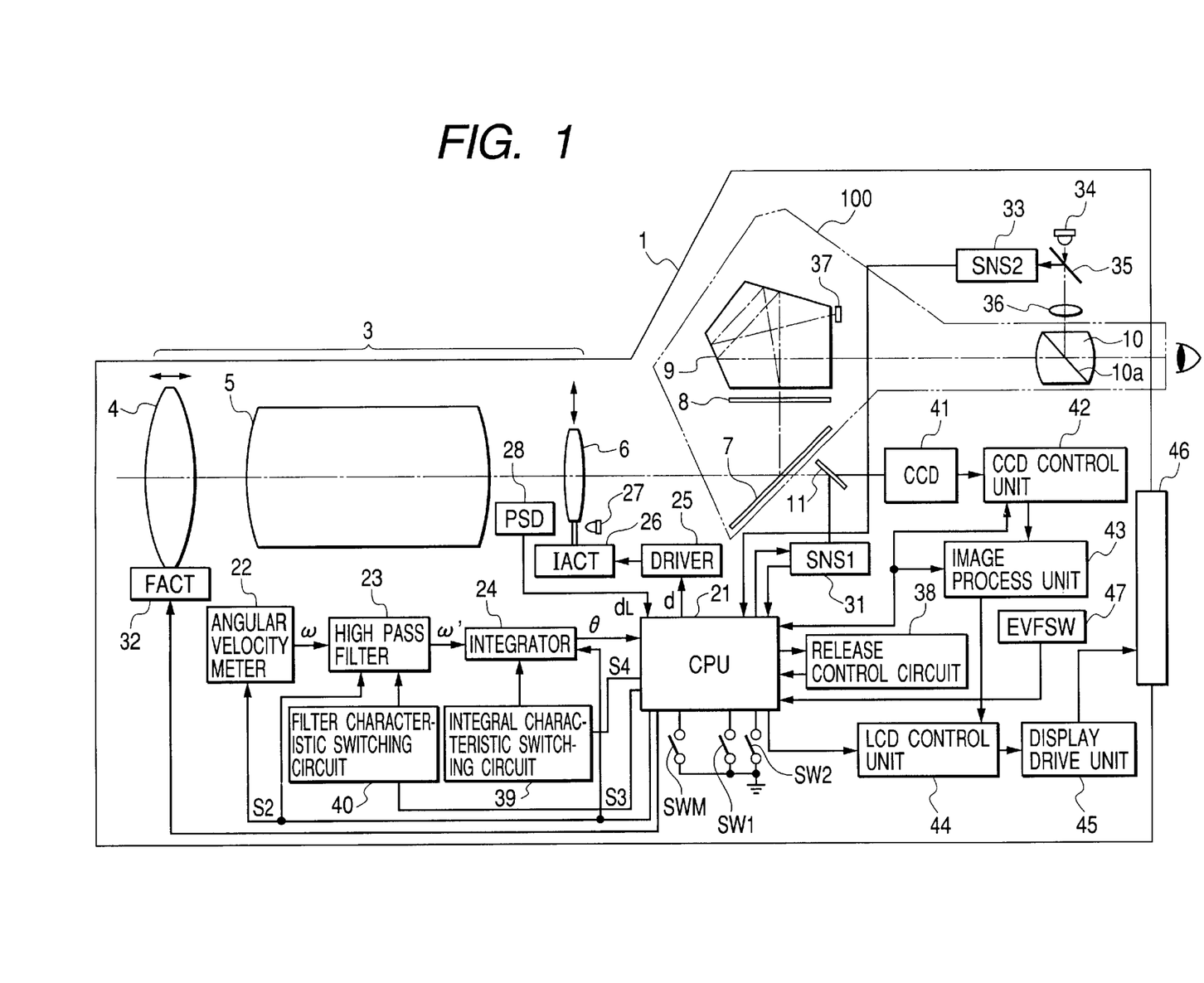
FIG. 1 is a diagram showing a main structure of a camera in a first embodiment.

FIG. 1 is a structural diagram showing a main part of a camera in accordance with a first embodiment of the present invention. In the figure, reference numeral 1 denotes a camera main body and 3 denotes a photographing lens. The photographing lens 3 is provided with a focusing lens 4, a magnification lens 5 and a blur correction optical system 6.

The focusing lens 4 is subjected to focus adjustment by a focus actuator 32. The magnification lens 5 changes a focal length of the photographing leans 3 by a magnification operation. The blur correction optical system 6 is provided such that it can move in a two-dimensional direction independently within a plane perpendicular to an optical axis. The blur correction optical system 6 is eccentrically driven by two pairs of image blur correction actuators 26.

Reference numeral 7 denotes a main mirror constituted of a half mirror, which splits light beams from a photographing optical system to a finder system (a finder 100 side discussed below) and an image pickup element (a CCD 41 side discussed below). Reference numeral 8 denotes a finder screen; 9 denotes a pentagonal prism; 10 denotes an eyepiece lens having a beam splitter portion 10a. Reference numeral 11 denotes a sub-mirror (half mirror), which guides transmitted light of the main mirror 7 to a focus detection sensor 31. Reference numeral 100 denotes an optical finder, which is constituted of the main mirror 7, the finder screen 8, the pentagonal prism 9 and the eyepiece lens 10.

Reference numeral 21 denotes a microcomputer, which is a one-chip microcomputer having a ROM, a RAM and A/D and D/A conversion functions. The microcomputer 21 performs automatic exposure control, automatic focus adjustment, image blur correction and detection of a line-of-sight direction of a photographer discussed later, judgement on whether a photographer is using the finder 100 or a display 46, control of the CCD 41 functioning as an image pickup element and control of the display 46 in accordance with a sequence program stored in the ROM. Reference numeral 22 denotes an angular velocity meter for detecting vibration of a camera, for which a so-called vibration gyro or the like is used. Reference numeral 23 denotes a high pass filter, which removes a bias component and a long-period drift component of an output signal ω from the angular velocity meter 22 and outputs an angular velocity signal ω'. Reference numeral 24 denotes an integrator, which converts the angular velocity signal ω' into an angular displacement signal (vibration signal) θ.

Reference numeral 40 denotes filter characteristic switching circuit for changing a high pass band of a frequency of the high pass filter 23 according to a signal from the microcomputer 21. Reference numeral 39 denotes integral characteristic switching circuit for changing a high pass band of a frequency of the integrator 24 according to a signal from the microcomputer 21.

The angular velocity meter 22, the high pass filter 23 and the integrator 24 are subjected to control such as start-stop and characteristic change by control lines S2, S3 and S4 from the microcomputer 21.

Reference numeral 25 denotes a driver circuit for the image blur correction actuators 26. When the vibration signal θ detected by the integrator 24 is converted into a lens displacement signal d for blur correction within the microcomputer 21, the displacement signal d is sent to the driver circuit 25 and the blur correction optical system 6 is driven. Reference numeral 27 denotes an infrared emission diode (IRED) and 28 denotes a position sensitive detector (PSD), which constitute a displacement detection system and detect displacement (dL) of the blur correction optical system 6 driven by the driver circuit 25. A signal of this displacement (dL) is sent to the microcomputer 21 as a feedback signal, whereby a feedback loop for controlling displacement of the blur correction optical system 6 according to a control amount (displacement signal) d is constituted.

Note that since image blur of the camera is caused by vibration in two directions, a vertical direction (pitch) and a horizontal direction (yaw), two pairs of image blur correction elements are prepared for the angular velocity meter 22 to the PSD 28, respectively. However, only one pair is shown in FIG. 1 for simplicity of the drawing.

Reference numeral 31 denotes a focus detection sensor and 32 denotes an actuator for focus adjustment. Reference numeral 33 denotes a line-of-sight detection sensor consisting of a two-dimensional CCD and the like for detecting a line-of-sight direction of a photographer, and 34 denotes an infrared emission diode (IRED) for illuminating a pupil of the photographer for line-of-sight detection.

Light emitted by the IRED 34 is transmitted through a beam splitter 35 and a focusing lens 36, and then reflected by the beam splitter 10a to illuminate the pupil of the photographer. Then, an image of the illuminated pupil and a cornea reflection image of the IRED 34 are focused on the line-of-sight detection sensor 33 via the beam splitter 10a, the focusing lens 36 and the beam splitter 35 again. As the result, it is judged whether or not the pupil of the photographer has approached the eyepiece part and detects a line-of-sight direction of the pupil according to a predetermined algorithm.

Reference numeral 37 denotes a photometry sensor for measuring luminance of a subject. Reference numeral 38 denotes a release control circuit, which controls to drive a motor (not shown) for controlling the main mirror 7 and the sub-mirror 11 in a quick return manner and a stop (not shown).

Reference numeral 41 denotes a CCD functioning as an image pickup element for converting a photographed image projected on an image pickup surface by the photographing lens 3 into an analog electric signal. Reference numeral 42 denotes a CCD control unit, which includes a timing generator for supplying a transfer clock signal and a shutter signal to the CCD 41, a circuit for performing removal of noises and gain processing of a CCD output signal, an A/D conversion circuit for converting an analog signal into a 10 bit digital signal, and the like. Reference numeral 43 denotes an image process unit, which applies gamma conversion, color space conversion or an image process such as white balance, AE or flash correction to a 10 bit digital signal outputted from the CCD control unit 42 and outputs an 8 bit digital image signal (capture signal) of a YUV (4:2:2) format.

The photographing lens 3, the CCD 41, the CCD control unit 42 and the image process unit 43 are collectively referred to as a camera module.

Reference numeral 44 denotes an LCD control unit, which receives YUV digital image data transferred from the image process unit 43, converts the YUV digital image data into an RGB digital signal, and then outputs the RGB digital signal to a display drive unit 45. Reference numeral 45 denotes a display drive unit, which performs control for driving a display 46. Reference numeral 46 denotes a direct-view display for displaying an image, for which a TFT liquid crystal panel of the VGA standard (640×480 dots) is used.

Reference numeral 47 is a switch (EVFSW) provided on an exterior member of the camera. When the switch EVFSW is turned ON, an image is displayed on the display 46, and when it is turned OFF, the display 46 is turned OFF.

Reference symbol SWM denotes a main switch provided on the exterior member of the camera, which is turned ON by a switching operation of a switch knob or an operation of grasping a grip of the camera or the like by the photographer. When the main switch SWM is turned ON, the microcomputer 21 executes a predetermined sequence program stored in the ROM. Reference symbols SW1 and SW2 denote switches associated with a release button (not shown). The switch SW1 is turned ON by pressing the release button to a first stage and the switch SW2 is turned ON by subsequently pressing the release button to a second stage. When the switch SW1 is turned ON, the microcomputer 21 performs photometry exposure calculation, an automatic focus adjustment operation, an image blur correction operation, a lock operation for camera setting such as white balance and AE, and the like. In addition, the microcomputer 21 performs a reading out operation (record operation) of the capture signal with the turning ON of the switch SW2 as a trigger.

Figure 2:
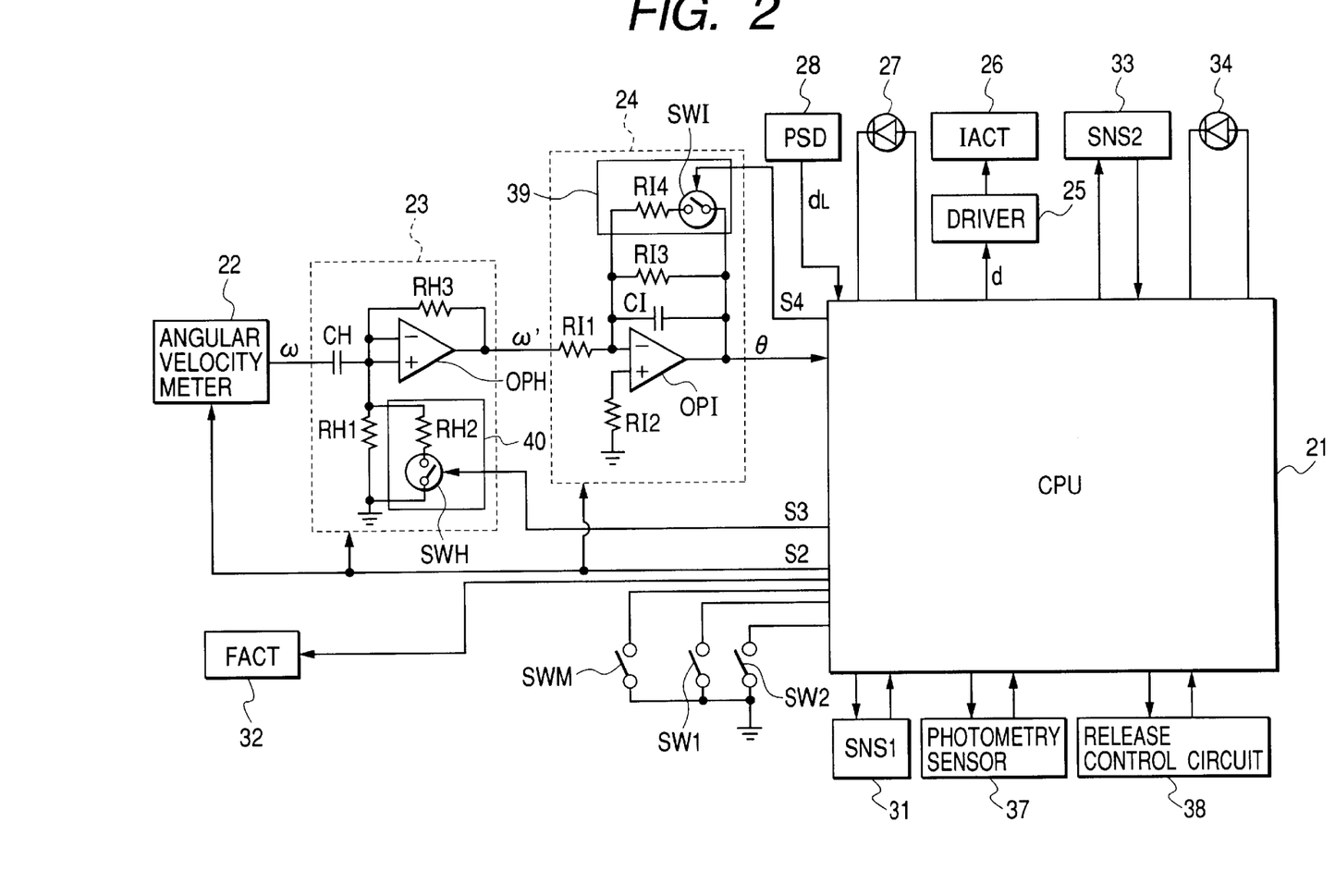
FIG. 2 is a circuit diagram showing a main part structure of FIG. 1.

FIG. 2 represents a vibration detection circuit portion among the structural elements in FIG. 1 and shows the high pass filter 23 and the integrator 24 in detail.

The high pass filter 23 is constituted of an operation amplifier OPH, resistances RH1 and RH3 and a capacitor CH.

The characteristic switching circuit 40 is constituted of a resistance RH2 and a switch SWH controlled to be turned ON/OFF by the microcomputer 21. Usually, the switch SWH is turned ON (closed). A cut-off frequency fH1 [Hz] at this point is represented by the following expression.

$$fH1=(RH1+RH2)/(2\pi \cdot RH1 \cdot RH2 \cdot CH)$$

Therefore, when an angular velocity signal ω from the angular velocity meter 22 is inputted, an angular velocity signal ω' with a component equal to or lower than fH1 [Hz] being cut is outputted.

On the other hand, when the switch SWH is turned OFF by the control line S3 from the microcomputer 21, the cut-off frequency fH2 is represented by the following expression.

$$fH2=1/(2\pi \cdot RH1 \cdot CH)<fH1$$

That is, when the switch SWH is turned OFF, a high pass characteristic is intensified and a hand vibration signal of a lower frequency can be detected.

On the other hand, the integrator 24 is constituted of an operation amplifier OPI, resistances RI1 to RI3 and a capacitor CI.

The characteristic switching circuit 39 is constituted of a resistance RI4 and a switch SWI controlled to be turned ON/OFF by the microcomputer 21. When the switch SWI is turned ON, a signal equal to or higher than a frequency found by the following expression is integrated.

$$fI1=(RI3+RI4)/(2\pi \cdot RI3 \cdot RI4 \cdot CI)$$

When the switch SWI is turned OFF, a signal equal to or higher than a frequency found by the following expression is integrated.

$$fI2=1/(2\pi \cdot RI3 \cdot CI)<fI1$$

That is, since an integration action for a low frequency signal is intensified when the switch SWI is turned OFF, hand vibration with large displacement at a low frequency can be corrected.

Further, the angular velocity meter 22, the high pass filter 23, the integrator 24 and the characteristic switching circuit 39 and 40 are hereinafter collectively referred to as vibration detection means.

Next, operation of the camera with the above-mentioned structure will be described in accordance with a flow chart of FIG. 3.

When a power supply switch (not shown) (which may be a switch automatically switched by loading of a battery, a switch for switching a power supply input circuit by a manual operation, or a power supply loading operation itself) is turned ON, a power supply is also inputted in the microcomputer 21. The microcomputer 21 advances the flow from step #301 to step #302 shown in FIG. 3 to start execution of a predetermined program.

In step #302, the microcomputer 21 clears and initializes all flag variables for control set in the RAM within the microcomputer 21. Then, in the next step #303, the microcomputer 21 judges a state of the main switch SWM, and if the switch SWM is turned OFF, the microcomputer 21 returns the flow to step #302, repeatedly executes these steps until the switch SWM is turned ON and comes to be in a standby state.

Thereafter, when it is judged that the main switch SWM is turned ON, the microcomputer 21 advances the flow to step #304, where the microcomputer 21 enables a CCD module including the CCD 41 and the CCD control unit 42. An image from the photographing lens 3 is transmitted through the main mirror 7 and picked up by the CCD 41, and an image signal of the image is outputted. In the next step #305, the microcomputer 21 starts display of the display 46 for confirming an object at the time of photographing. In the subsequent step #306, the microcomputer 21 detects ON/OFF of the switch SW1 associated with an operation of the release button (not shown). If the switch SW1 is turned OFF, the microcomputer 21 stays the flow in step #306 and repeats detection of a state of the switch SW1.

When it is judged that the switch SW1 is turned ON by pressing the release button (not shown) to the first stage, the microcomputer 21 advances the flow to step #307, where the microcomputer 21 judges whether or not image blur correction is performed. If a flag IS_START is 1, since image blur correction is performed, the microcomputer 21 advances the flow to step #311 and judges presence or absence of a line-of-sight input. On the other hand, if the flag IS_START is 0, since image blur correction is not performed, the microcomputer 21 advances the flow to step #308 and performs setting for starting image blur correction.

In step #308, the microcomputer 21 sets the flag IS_START to 1. Then, in the next step #309, the microcomputer 21 operates the vibration detection means, that is, the angular velocity meter 22, the high pass filter 23 and the integrator 24 by the control line S2 from the microcomputer 21 in FIG. 2 and captures an angular displacement signal (vibration signal) θ from the integrator 24 into the microcomputer 21. Subsequently, in step #310, the microcomputer 21 starts image blur correction control. More specifically, the microcomputer 21 sends a displacement signal d of the blur correction optical system 6 to the driver circuit 25, operates the driver circuit 25, the image blur correction actuators 26, the IRED 27 and the PSD 28, drives the blur correction optical system 6 and controls image blur on the image pickup surface of the CCD 41 and image blur on the finder screen 8.

As discussed later, a timer within the microcomputer 21 starts simultaneously with the start of image blur correction control, and an image blur correction interruption process is performed every fixed time.

In the next step #311, the microcomputer 21 performs detection of a line of sight. More specifically, the microcomputer 21 turns on the IRED 34 of FIG. 2, and the line-of-sight detection sensor 33 performs accumulation of images in synchronous with this. Then, after completing the accumulation, an image signal is sent to the microcomputer 21, and the microcomputer 21 performs detection of presence or absence of a pupil of the photographer and a line-of-sight direction in accordance with a predetermined algorithm. Since details of the line-of-sight detection principle and the algorithm are described in Japanese Patent Application Laid-Open No. 1-241511, detailed descriptions on them will be omitted.

In the next step #312, the microcomputer 21 performs judgment of results of the line-of-sight detection. In this embodiment, since information concerning a line-of-sight direction is unnecessary, it is sufficient to find if the pupil has approached. Thus, upon judging that the pupil has approached (which, of course, may be a result that a direction of the line of sight could have been decided), the microcomputer 21 advances the flow to step #313 and sets a flag SHISEN to 1. On the other hand, if it is judged that the pupil has not approached, the microcomputer 21 advances the flow to step #314 and sets the flag SHISEN to 0. Here, in step #312, if it is detected that the pupil of the photographer has approached, since the photographer is looking into the finder 100, display of the display 46 may be turned OFF.

In the next step #315, the microcomputer 21 measures luminance of the object by the photometry sensor 37 and calculates a stop control value and a shutter time control value in accordance with a predetermined program based on information of the luminance. Then, in step #316, the microcomputer 21 detects a defocus amount of the object by the focus detection sensor 31 and drives the actuator 32 based on a result of the detection to perform focus adjustment. In the subsequent step #317, the microcomputer 21 judges ON/OFF of the switch SW2. If the switch SW2 is turned OFF, the microcomputer 21 returns the flow to step #306 and repeats the flow of steps #307 to #316. In this way, an image blur correction interruption process discussed below is performed for a plurality of times every fixed time while the flow of steps #307 to #316 are repeated. Then, when the switch SW2 is turned ON, the microcomputer 21 advances the flow to step #318.

In step #318, the microcomputer 21 performs an up operation of the main mirror 7. Then, in the next step #319, the microcomputer 21 reads out a capture signal, and after a predetermined process of the image process unit 43, writes data of a YUV signal in a pixel development area in a RAM (not shown). This data is subjected to an image compression process in accordance with the JPEG standard, and then is written (recorded) in data storing means (not shown) as an image file. Subsequently, in step #320, the microcomputer 21 performs a down operation of the main mirror 7. Thereafter, the microcomputer 21 advances the flow to step S306 again and judges ON/OFF of the switch SW1.

Next, an image blur correction interruption process, which is performed every fixed time, will be described. This process is performed for a plurality of times during the flow of the above-mentioned steps #306 to #316 of FIG. 3.

Image blur correction interruption is timer interruption that occurs every fixed time (e.g., 500 μsec). Since control in a pitch direction (vertical direction) and control in a yaw direction (horizontal direction) are alternately performed, a sampling period of one direction in this case is 1 msec. In addition, a result of calculation naturally becomes separate data for the pitch direction and the yaw direction even if a control method (calculation coefficient or the like) is the same. Thus, reference addresses are set for pitch and yaw, respectively, data such as a result of calculation is designated by an indirect address of a RAM, and the reference addresses are switched at the pitch control time and the yaw control time, whereby the image blur correction interruption is performed.

Figure 4:
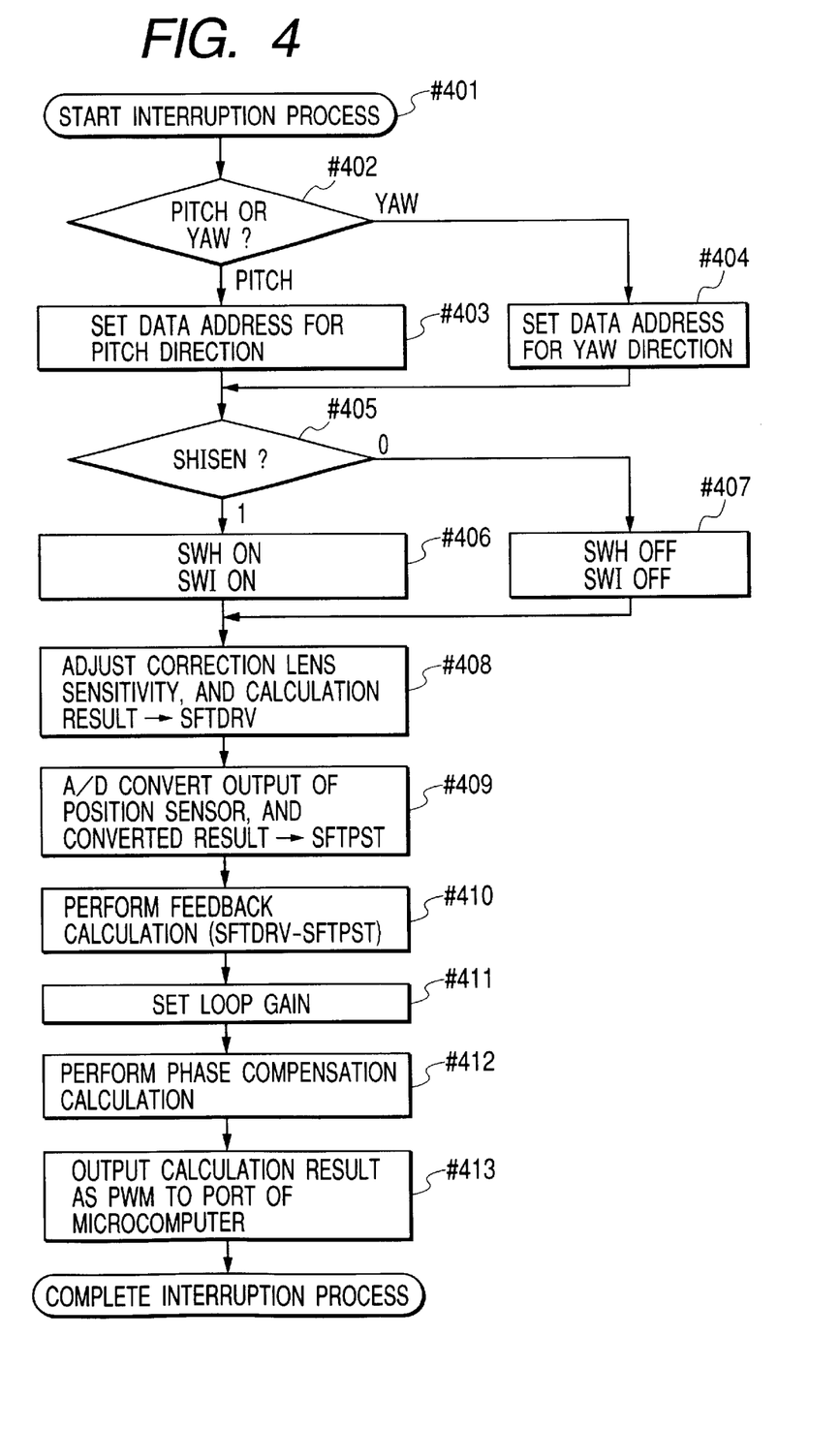
FIG. 4 is a flow chart showing an image blur correction interruption process in the first embodiment.

FIG. 4 is a flow chart showing a process of image blur correction interruption. The process will be hereinafter described in accordance with this flow chart.

When interruption occurs in step #401, the microcomputer 21 advances the flow to step #402, whereby microcomputer 21 judges whether a current control direction is the pitch direction or the yaw direction. If it is the pitch direction, the microcomputer 21 advances the flow to step #403 and sets a data address such that various flags, coefficients and calculation results can be read and written as pitch data. In addition, if it is the yaw direction, the microcomputer 21 advances the flow to step #404 and sets a data address such that various flags, coefficients and calculation results can be read and written as yaw data.

Figure 3:
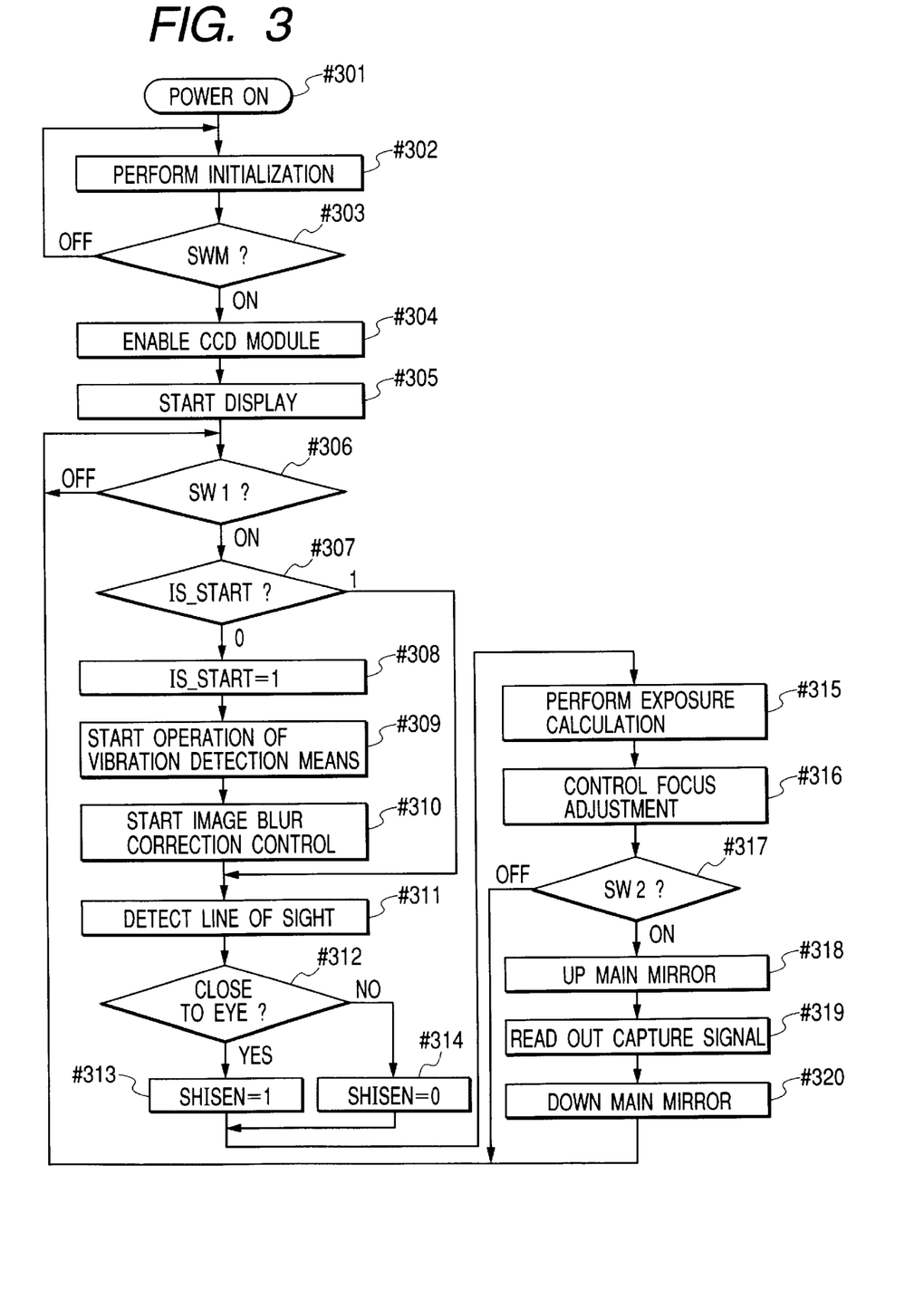
FIG. 3 is a flow chart showing operations of the camera in the first embodiment.

Thereafter, the microcomputer 21 advances the flow to step #405 in both the cases and judges the flag SHISEN that is set in step #313 or step #314 of FIG. 3. The microcomputer 21 advances the flow to step #406 if the flag SHISEN is 1 or to step #407 if the flag SHISEN is 0.

If the microcomputer 21 advances the flow to step #406, since the flag SHISEN is 1, that is, there is a line-of-sight input and the photographer is using the finder 100 to perform photographing, the microcomputer 21 turns ON the switch SWH of the characteristic switching circuit 40 and the switch SWI of the characteristic switching circuit 39 of FIG. 2. On the other hand, if the microcomputer 21 advances the flow to step #407, since the flag SHISEN is 0, that is, there is no line-of-sight input and the photographer is using the display 46 to perform photographing, the microcomputer 21 turns OFF the switch SWH of the characteristic switching circuit 40 and the switch SWI of the characteristic switching circuit 39 of FIG. 2. Consequently, the high pass characteristic of the high pass filter 23 is intensified and a hand vibration signal of a lower frequency can be detected. In addition, since an integration action for a low frequency signal of the integrator 24 is intensified, hand vibration with large displacement at a low frequency can be corrected.

Next, the microcomputer 21 advances the flow to step #408, where, since an eccentricity amount (sensitivity) of a correction lens with respect to vibration angular displacement changes according to a position of a focus, the microcomputer 21 adjusts the change. More specifically, the microcomputer 21 divides a focus position into several zones, reads out an average sensitivity (deg/mm) in each zone from table data and converts the sensitivity into correction lens driving data. Results of the calculation are stored in a RAM area that is set by SFTDRV within the microcomputer 21. In the next step #409, an output of the position sensitive detector (PSD) 28 for detecting a position of the blur correction optical system 6 is A/D converted, and results of the A/D conversion is stored in an RAM area that is set by SFTPST within the microcomputer 21. In the subsequent step #410, the microcomputer 21 performs feedback calculation (SFTDRV−SFTPST).

In the next step #411, the microcomputer 21 multiplies a loop gain by results of the above-mentioned feedback calculation. Then, in the next step #412, the microcomputer 21 performs phase compensation calculation in order to make the control system stable. In the subsequent step #413, the microcomputer 21 outputs results of the phase compensation calculation to a port of the microcomputer 21 as a lens displacement signal d for blur correction, and the interruption ends.

The above-mentioned displacement signal d is inputted in the driver circuit 25, the blur correction optical system 6 is driven by the image blur correction actuators 26 and image blur correction is performed.

In the first embodiment, a line-of-sight input of a photographer is judged by the line-of-sight detection sensor consisting of the infrared emission diode (IRED) for illuminating a pupil of the photographer for line-of-sight detection, the two-dimensional CCD and the like. If there is no line-of-sight input, it is judged that the photographer is using the display 46 to perform photographing, and a frequency band for image blur correction is extended to a lower frequency.

Consequently, in the camera provided with the finder and the display, it is possible to judge whether the finder is used or the display is used at the time of photographing. In addition, not only hand vibration correction in using the finder can be performed satisfactorily but also correction of hand vibration of a low frequency can be performed satisfactorily even if the display is used to perform photographing. Further, here, when it is judged that the finder is used, the display may be turned OFF.

Further, in the first embodiment, the high pass filter 23 and the integrator 24 are constituted outside the microcomputer 21 in an analog manner. However, a system may be adopted which captures an output of the angular velocity meter 22 directly or after amplification and applies high pass filter calculation and integration calculation to the output within the microcomputer 21.

In addition, in the first embodiment, judgement on whether a photographer is using the finder or the display is performed by detection of a line-of-sight input of the photographer. However, other methods may be adopted. For example, a system may be adopted which measures reflected light from an object by a light projecting and receiving system arranged in the vicinity of the finder and detects approach of a face.

Second Embodiment

In a second embodiment, an example according to a combination of a digital single-lens reflex camera and a replaceable lens with an image blur correction function will be described.

Figure 5:
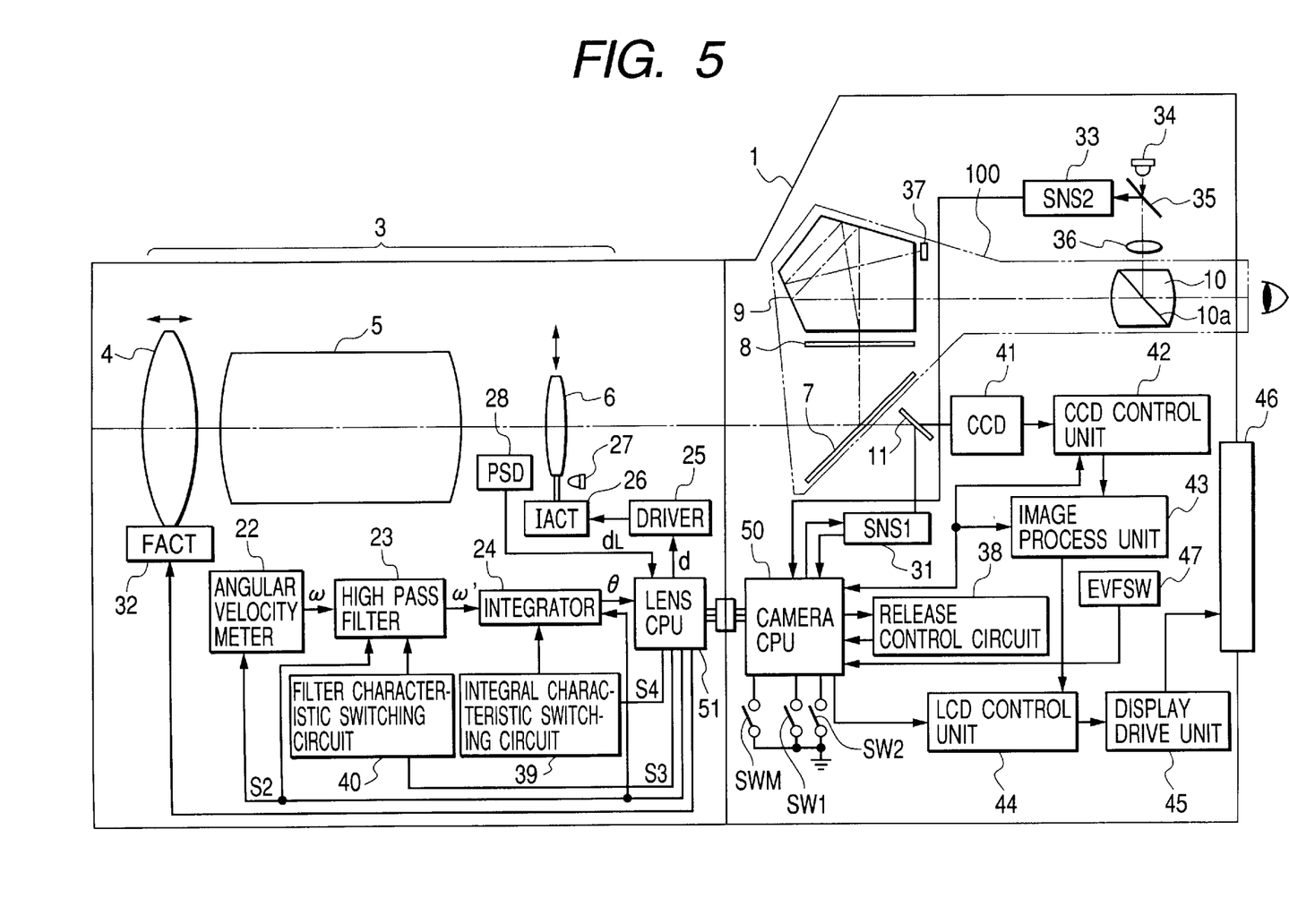
FIG. 5 is a diagram showing a main structure of a camera in a second embodiment.

FIG. 5 is a diagram showing a main part of a camera in accordance with the second embodiment of the present invention. In the figure, elements of the camera equivalent to those in the first embodiment shown in FIG. 1 are denoted by the same reference symbols and descriptions of the elements will be omitted.

In the figure, reference numeral 50 denotes a microcomputer of a camera (hereinafter referred to as camera microcomputer), which is a one-chip microcomputer having a ROM, a RAM and A/D and D/A conversion functions. The microcomputer 50 performs automatic exposure control, automatic focus detection, detection of a line-of-sight direction of a photographer, judgement on whether a photographer is using a finder or a display, control of the CCD 41 functioning as an image pickup element and control of the display 46, and communication with a microcomputer 51 for a lens discussed later in accordance with a sequence program stored in the ROM.

Reference numeral 51 denotes a microcomputer of a lens (hereinafter referred to as lens microcomputer), which is a one-chip microcomputer having an ROM, an RAM and A/D and D/A conversion functions. The microcomputer 51 performs image blur correction, driving of a focus actuator 32, and communication with a camera microcomputer 50 in accordance with a sequence program stored in the ROM.

Main operations of the camera in accordance with the second embodiment are the same as those shown in the flow chart of FIG. 3 described in the first embodiment. Therefore, detailed descriptions of the operations will be omitted.

However, the following operations are performed by communication between the camera microcomputer 50 and the lens microcomputer 51.

(1) When it is detected that the switch SW1 associated with an operation of a release button (not shown) is turned ON in step #306 of FIG. 3, the camera microcomputer 50 sends a signal informing that the switch SW1 is turned ON to the lens microcomputer 51. The lens microcomputer 51 starts a process for image blur correction in steps #307 to #310 with this signal as a trigger.

(2) The camera microcomputer 50 sends a judgment result (flag SHISEN) of line-of-sight detection in step #312 of FIG. 3 to the lens microcomputer 51.

(3) In step #316 of FIG. 3, a defocus amount of an object is detected by the focus detection sensor 31, and the camera microcomputer 50 sends the defocus amount to the lens microcomputer 51. The lens microcomputer 51 drives the actuator 32 based on the received defocus amount to perform focus adjustment.

In the second embodiment, a line-of-sight input of a photographer is judged by the line-of-sight detection sensor consisting of the infrared emission diode (IRED) for illuminating a pupil of the photographer for line-of-sight detection, the two-dimensional CCD and the like in the combination of the digital single-lens reflex camera and the replaceable lens with an image blur correction function. If there is no line-of-sight input, it is judged that the photographer is using the display 46 to perform photographing, and a frequency band for image blur correction is extended to a lower frequency.

Consequently, in the camera provided with the finder and the display, it is possible to judge whether the finder is used or the display is used at the time of photographing. In addition, not only hand vibration correction in using the finder can be performed satisfactorily, but also correction of hand vibration of a low frequency can be performed satisfactorily even if the display is used to perform photographing. Further, here, when it is judged that the finder is used, the display may be turned OFF.

Further, in the second embodiment, the vibration detection means constituted by the angular velocity meter 22, the high pass filter 23, the integrator 24 and the characteristic switching circuit 39 and 40 is provided within the replacement lens. However, a system may be adopted which provides vibration detection means within a camera and sends a lens displacement signal d for blur correction from the camera microcomputer 50 to the lens microcomputer 51.

Third Embodiment

In the first and second embodiments, judgement on whether a photographer is using the finder or the display to perform photographing is performed by detecting presence or absence of a line-of-sight input of the photographer or by detecting approach of a face by a light projecting and receiving system arranged in the vicinity of the finder. In this third embodiment, judgement on whether a photographer is using a finder or a display is performed according to a state of the switch EVFSW 47 for turning ON/OFF the display 46.

Figure 6:
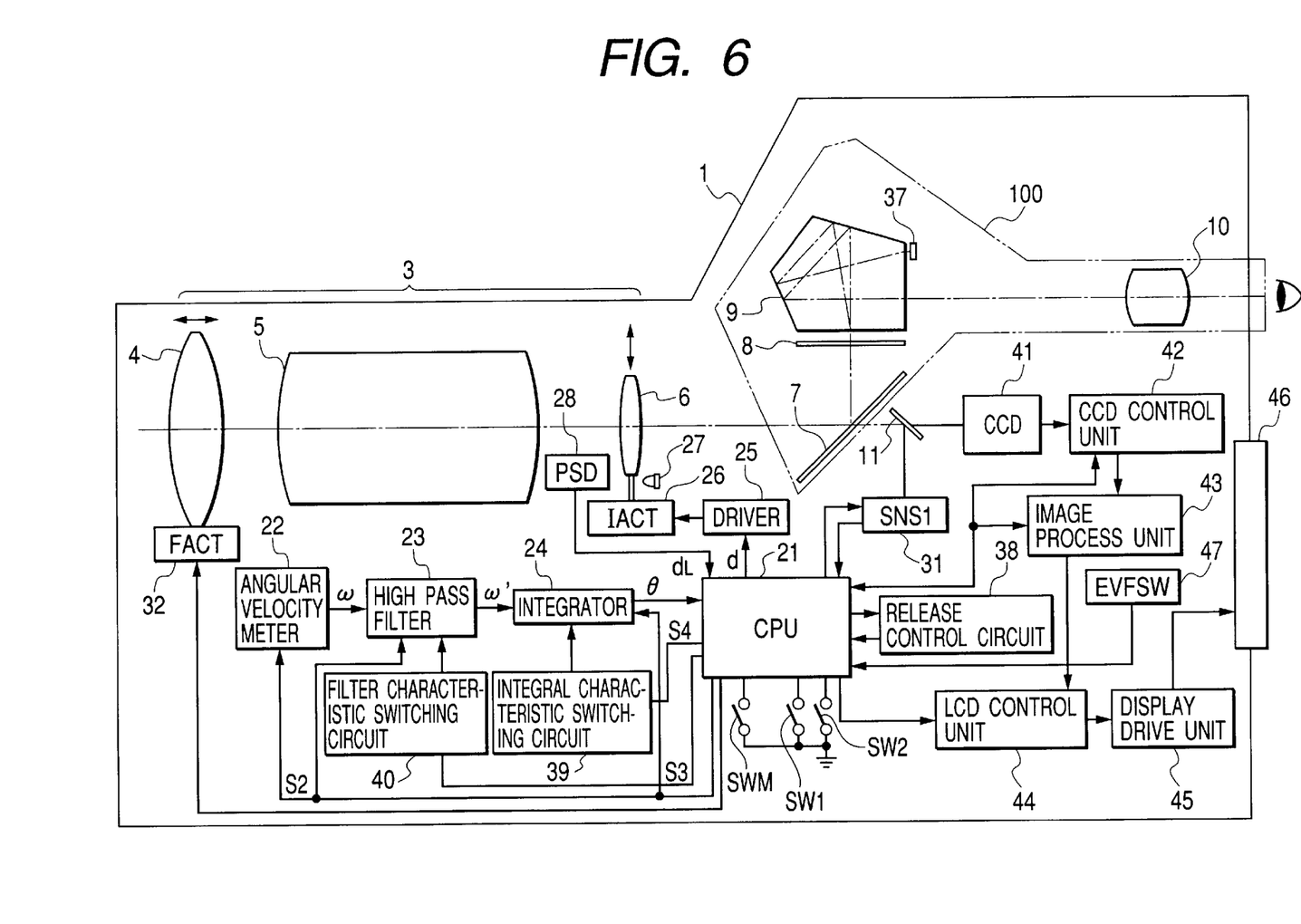
FIG. 6 is a diagram showing a main structure of a camera in a third embodiment.

FIG. 6 is a diagram showing a main part of a camera in accordance with the third embodiment of the present invention. In the figure, elements equivalent to those of the camera in the first embodiment shown in FIG. 1 are denoted by the same reference symbols and descriptions of the element will be omitted.

In the camera in accordance with the third embodiment, the line-of-sight detection sensor 33 consisting of the two-dimensional CCD and the like for detecting a line-of-sight direction of a photographer, the infrared emission diode (IRED) 34 for illuminating a pupil of the photographer for line-of-sight detection, the beam splitter 35, the focusing lens 36 and the beam splitter 10a are removed from the camera in the first embodiment shown in FIG. 1.

Next, operations of the camera having the above-mentioned structure will be described in accordance with a flow chart of FIG. 7.

Figure 7:
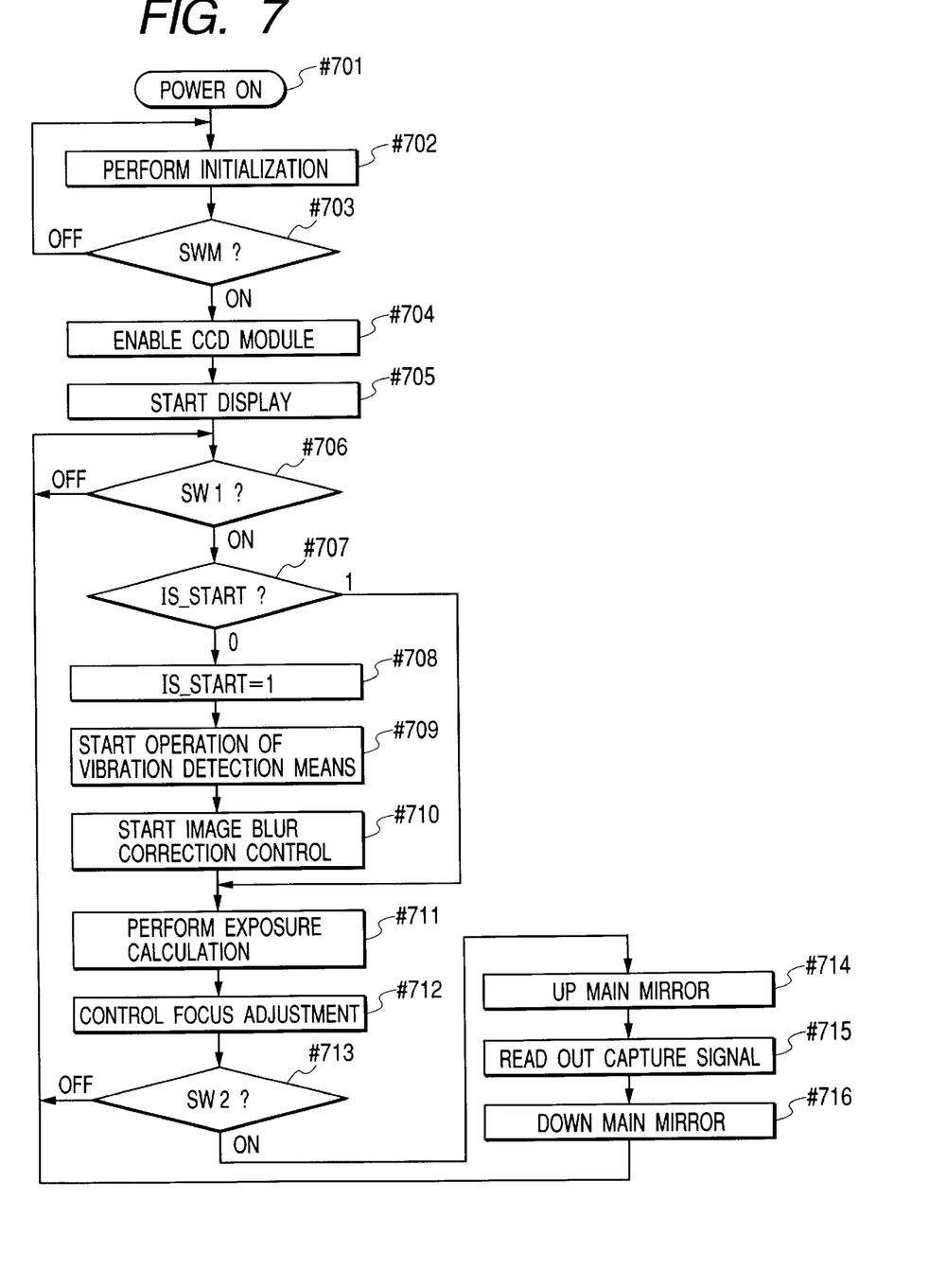
FIG. 7 is a flow chart showing operations of the camera in the third embodiment.

Steps #701 to #710 of FIG. 7 are completely the same as steps #301 to #310 showing the operations of the camera in the first embodiment. Therefore, descriptions of the steps will be omitted.

Thereafter, in the first embodiment, the microcomputer 21 performs detection of a line of sight and judgement on presence or absence of a line-of-sight input in steps #311 to #314. The microcomputer 21 does not perform these operations but performs operations of steps #711 to #716 in the third embodiment. However, since these operations are completely the same as steps #315 to #320 of FIG. 3, descriptions of them will also be omitted.

Next, a process of image blur correction interruption that is performed every fixed time will be described in accordance with a flow chart of FIG. 8.

Figure 8:
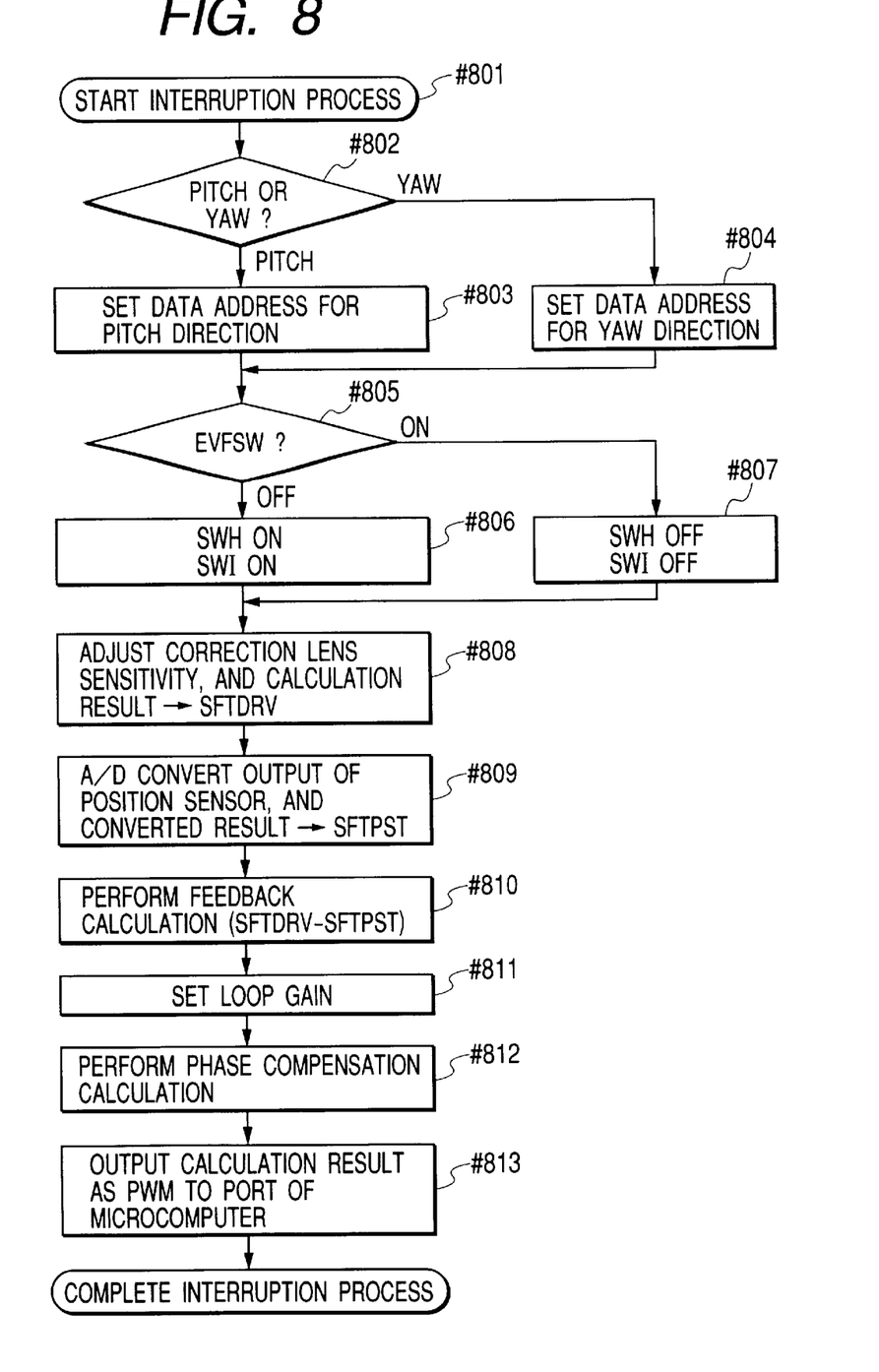
FIG. 8 is a flow chart showing an image blur correction interruption process in the third embodiment.

Steps #801 to #804 of FIG. 8 are completely the same as steps #401 to #404 of FIG. 4 showing an image blur correction interruption process in the first embodiment. Therefore, descriptions of the steps will be omitted.

After the operation of step #804, the microcomputer 21 advances the flow to step #805, where the microcomputer 21 detects a state of the switch EVFSW that is provided on an exterior member of the camera and switches ON/OF of the display 46. As a result, the microcomputer 21 advances to step #806 if the switch EVFSW is turned OFF or advances to step #807 if the switch EVFSW is turned ON.

If the microcomputer 21 advances the flow to step #806, the switch EVFSW is turned OFF, that is, a photographer is using the finder 100 to perform photographing. Thus, the microcomputer 21 turns on the switch SWH of the characteristic switching circuit 40 and the switch SWI of the characteristic switching circuit 39 of FIG. 6. On the other hand, if the microcomputer 21 advances the flow to step #807, the switch EVFSW 47 is turned ON, that is, the photographer is using the display 46 to perform photographing. Thus, the microcomputer 21 turns off the switch SWH of the characteristic switching circuit 40 and the switch SWI of the characteristic switching circuit 39.

Consequently, the high pass characteristic of the high pass filter 23 is intensified and a hand vibration signal of a lower frequency can be detected. In addition, since the integration action of a low frequency signal of the integrator 24 is intensified, hand vibration of large displacement at a low frequency can be corrected.

Subsequent steps #808 to #813 are completely the same as steps #408 to #413 of FIG. 4. Therefore, descriptions of the steps will also be omitted.

According to the third embodiment, in the camera that is not provided with a light projecting and receiving system arranged in the vicinity of the means for detecting a line of sight of a photographer or the finder for detecting approach of a face of the photographer, the microcomputer 21 detects a state of a switch for switching ON/OFF of the display, thereby judging whether the photographer is using the finder or the display.

Thus, hand vibration of a low frequency in using the display to perform photographing can be corrected satisfactorily and, at the same time, it becomes possible to judge whether the photographer is using the finder or the display at the time of photographing.

Figure 9:
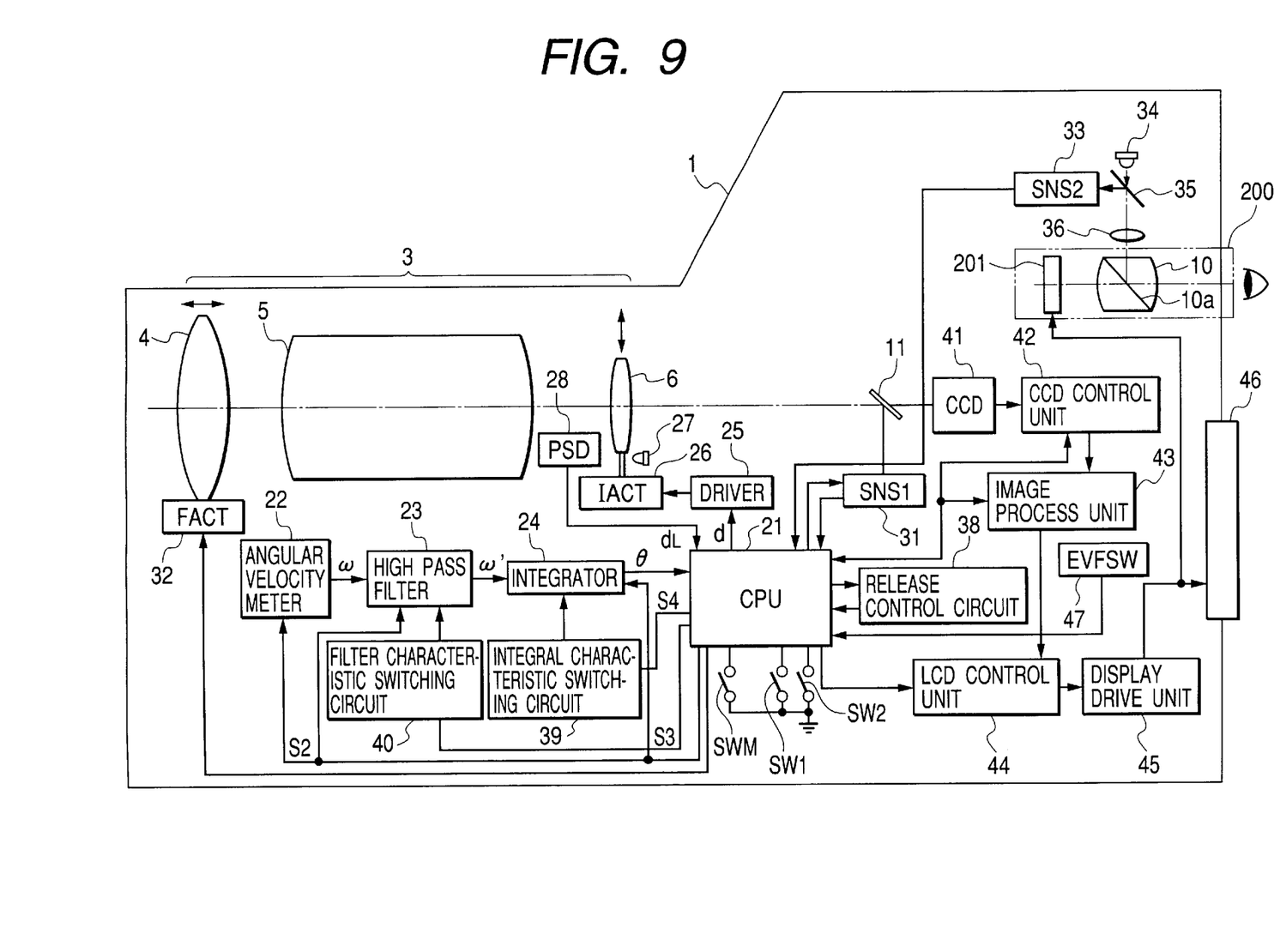
FIG. 9 is a diagram showing a main structure of a camera in a fourth embodiment.

Further, in each of the above-mentioned embodiments, a finder is described with the optical finder 100 as an example. However, as shown in FIG. 9, an electronic finder 200 may be used in each of the above-mentioned embodiments. This example will be described with reference to FIG. 9.

Fourth Embodiment

FIG. 9 is a diagram showing a main part of a camera in accordance with a fourth embodiment of the present invention. In the figure, elements equivalent to those shown in FIG. 1 are denoted by the same reference symbols and descriptions of the elements will be omitted.

In FIG. 9, reference numeral 200 denotes an electronic finder. The electronic finder 200 is constituted by a small display 201 made of a liquid crystal panel and an eyepiece lens 10 for guiding an image displayed on the small display 201 to a pupil of a photographer. An image signal obtained by the CCD 41 is inputted in the small display 201 via the LCD control unit 44 and the display drive unit 45 and an image is displayed thereon.

Note that, since operations are the same as each of the above-mentioned embodiments, descriptions on the operations will be omitted.

As described above, an optical apparatus having a finder and a display can be provided which can perform image blur correction satisfactorily even if any one of the finder and the display is used to perform photographing.

In addition, an optical apparatus can be provided which can satisfactorily correct low frequency hand vibration in using a display to perform photographing.

Further, an optical apparatus can be provided which can judge whether a finder or a display is used.

What is claimed is:

1. An optical apparatus having an optical system, comprising:

a sensor for detecting vibration that is caused in said optical apparatus;

a blur correction unit for correcting blur of an image obtained by said optical system;

a control unit for controlling driving of said blur correction unit according to an output of said sensor;

a finder for observing the image obtained by said optical system, said finder having an eyepiece optical system; and a display for displaying the image obtained by said optical system, wherein said control unit changes a vibration detection frequency band depending on whether said finder is used or said display is used.

2. An optical apparatus according to claim 1, wherein said finder is an optical finder.

3. An optical apparatus according to claim 1, wherein said finder is an electronic finder for observing the image displayed on said display via said eyepiece optical system.

4. An optical apparatus according to claim 1, wherein, when said display is used, said control unit extends the vibration detection frequency band of said sensor to a frequency area lower than that at the time when said finder is used.

5. An optical apparatus according to claim 1, further comprising a detection unit for detecting whether or not a photographer has approached said finder, wherein said control unit changes a control characteristic of said blur correction unit according to an output of said detection unit.

6. An optical apparatus according to claim 1, further comprising a switch for switching display and non-display states of said display, wherein said control unit changes a control characteristic of said blur correction unit according to the state of said switch.

* * * * *

UNITED STATES PATENT AND TRADEMARK OFFICE
CERTIFICATE OF CORRECTION

PATENT NO.     : 6,628,898 B2
DATED          : September 30, 2003
INVENTOR(S)    : Takayuki Endo It is certified that error appears in the above-identified patent and that said Letters Patent is hereby corrected as shown below:

<u>Title page,</u>
Item [57], ABSTRACT,
Line 1, "includes" should read -- including --.

<u>Column 6,</u>
Line 62, "circuit" should read -- circuits --.

<u>Column 7,</u>
Line 66, "synchronous" should read -- synchronism --.

<u>Column 8,</u>
Lines 34 and 52, "for" should be deleted.

<u>Column 10,</u>
Line 60, "an" (both occurrences) should read -- a --.

<u>Column 11,</u>
Line 46, "circuit" should read -- circuits --.

<u>Column 13,</u>
Line 28, "on" should read -- of --.

Signed and Sealed this

Third Day of February, 2004

JON W. DUDAS
*Acting Director of the United States Patent and Trademark Office*